United States Patent
Dudney et al.

(10) Patent No.: US 9,837,665 B2
(45) Date of Patent: Dec. 5, 2017

(54) LIPON COATINGS FOR HIGH VOLTAGE AND HIGH TEMPERATURE LI-ION BATTERY CATHODES

(71) Applicant: UT-Battelle, LLC, Oak Ridge, TN (US)

(72) Inventors: Nancy J. Dudney, Knoxville, TN (US); Chengdu Liang, Knoxville, TN (US); Jagjit Nanda, Knoxville, TN (US); Gabriel M. Veith, Knoxville, TN (US); Yoongu Kim, Highlands Ranch, CO (US); Surendra Kumar Martha, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 15/416,508

(22) Filed: Jan. 26, 2017

(65) Prior Publication Data
US 2017/0133686 A1    May 11, 2017

Related U.S. Application Data

(62) Division of application No. 13/651,043, filed on Oct. 12, 2012, now Pat. No. 9,570,748.

(51) Int. Cl.
*H01M 4/62* (2006.01)
*H01M 4/04* (2006.01)
(Continued)

(52) U.S. Cl.
CPC .......... *H01M 4/628* (2013.01); *H01M 4/366* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| 5,314,765 A | 5/1994 | Bates |
| 5,338,625 A | 8/1994 | Bates et al. |

(Continued)

FOREIGN PATENT DOCUMENTS

| CN | 1789483 A | 6/2006 |
| KR | 2002/0049811 A | 6/2002 |

(Continued)

OTHER PUBLICATIONS

Kang et al. Enhancing the rate capability of high capacity xLi2MnO3 * (1-x)LiM02 (M=Mn, Ni, Co) electrodes by Li—Ni—PO4 treatment. Electrochemistry Communications. Jan. 29, 2009. pp. 748-751.

(Continued)

*Primary Examiner* — Patrick Ryan
*Assistant Examiner* — Christopher Domone
(74) *Attorney, Agent, or Firm* — Fox Rothschild LLP

(57) ABSTRACT

A lithium ion battery includes an anode and a cathode. The cathode includes a lithium, manganese, nickel, and oxygen containing compound. An electrolyte is disposed between the anode and the cathode. A protective layer is deposited between the cathode and the electrolyte. The protective layer includes pure lithium phosphorus oxynitride and variations that include metal dopants such as Fe, Ti, Ni, V, Cr, Cu, and Co. A method for making a cathode and a method for operating a battery are also disclosed.

9 Claims, 17 Drawing Sheets

(51) Int. Cl.
  H01M 10/052    (2010.01)
  H01M 10/0525   (2010.01)
  H01M 4/36      (2006.01)
  H01M 4/02      (2006.01)

(56) References Cited

U.S. PATENT DOCUMENTS

| | | | |
|---|---|---|---|
| 6,017,654 A | 1/2000 | Kumta et al. | |
| 6,863,699 B1 | 3/2005 | Krasnov et al. | |
| 7,211,351 B2 | 5/2007 | Klaassen | |
| 7,273,682 B2 | 9/2007 | Park et al. | |
| 7,344,804 B2 | 3/2008 | Klaassen | |
| 7,540,886 B2 | 6/2009 | Zhang et al. | |
| 7,645,543 B2 | 1/2010 | Visco et al. | |
| 8,906,553 B1 | 12/2014 | Hagh et al. | |
| 2003/0186128 A1* | 10/2003 | Singh | C01G 45/1242 429/231.1 |
| 2008/0020283 A1* | 1/2008 | Miyashiro | B82Y 30/00 429/322 |
| 2008/0286651 A1 | 11/2008 | Neudecker et al. | |
| 2010/0119947 A1 | 5/2010 | Lee et al. | |
| 2010/0242265 A1 | 9/2010 | Wadley et al. | |
| 2011/0136006 A1 | 6/2011 | Nogi et al. | |
| 2011/0200881 A1* | 8/2011 | Wang | H01M 4/0421 429/231.1 |
| 2012/0080649 A1 | 4/2012 | Koenig, Jr. et al. | |

FOREIGN PATENT DOCUMENTS

| | | |
|---|---|---|
| KR | 2005/0009170 A | 1/2005 |
| WO | 2010/074690 A1 | 7/2010 |

OTHER PUBLICATIONS

Amatucci et al., "Cobalt dissolution in LiCoO2-based non-aqueous rechargeable batteries", Solid State Ionics (1996) 83: 167-173.
Amatucci et al., "CoO2, the end member of the LixCoO2 solid solution", J. Electrochem. Soc. (1996) 143: 1114-1123.
Arora et al., "Capacity fade mechanisms and side reactions in lithium-ion batteries", J. Electrochem. Soc. (1998) 145: 3647-3667.
Bates et al., "Electrical properties of amorphous lithium electrolyte thin films", Solid State Ionics (1992) 53-56(Pt. 1): 647-654.
Bates et al., "Fabrication and characterization of amorphous lithium electrolyte thin films and rechargeable thin-film batteries", J. Power Sources (1993) 43 (1-3): 103-110.
Chebiam et al., "Soft chemistry synthesis and characterization of layered LirxNli-vCov02_6(0 5 x 5 1 and 0 5 y 5 1)", Chem. Mater. (2001) 13(9): 2951-2957.
Chen et al., "Role of surface coating on cathode materials for lithium-ion batteries", J. Mater. Chem. (2010) 20: 7606-7612.
Cho et al., "Novel LiCoO2 cathode material with Al2O3 coating for a Li Ion cell", Chem. Mater. (2000) 12: 3788-3791.
Cho et al., "The effect of a metal-oxide coating on the cycling behavior at 55° C. in orthorhombic LiMnO2 cathode materials", J. Electrochem. Soc. (2002) 149: A288-A292.
Cho et al., "Zero-strain intercalation cathode for rechargeable Li-Ion cell", Agnew. Chem. Int. Ed. (2001) 40: 3367-3369.
Chung et al., "Structural studies on the effects of ZrO2 coating on LiCoO2 during cycling using in situ x-ray diffraction technique", J. Electrochem. Soc., (2006) 153: A2152-A2157.
Dudney, "Solid-state thin-film rechargeable batteries", Mat. Sci. Eng. B (2005) 116: 245-249.
Fang et al., "Improving the electrochemical performance of LiCoO2 cathode by nanocrystalline ZnO coating", J. Electrochem. Soc. (2005) 152: A1701-A1706.
Jang et al., "Dissolution of spine! oxides and capacity losses in; 4 V Li / LixMn2O4 cells", J. Electrochem. Soc. (1996) 143(7): 2204-2211.
Jung et al., "Enhanced stability of LiCoO2 cathodes in lithium-ion batteries using surface modification by atomic layer deposition", J. Electrochem. Soc. (2010) 157: A75-A81.
Kim et al., "Ion-implantation modification of lithium-phosphorus oxynitride thin-films", J. Power Sources (2002) 109(1): 214-219.
Lee et al., "The effect of zirconium oxide coating on the lithium nickel cobalt oxide for lithium secondary batteries", Electrochimica Acta (2006) 52: 1507-1513.
Levi et al., "Solid-state electrochemical kinetics of Li-Ion intercalation into Lit _x 0002: Simultaneous application of electroanalytical techniques SSCV, PITT, and EIS articles", J. Electrochem. Soc. (1999) 146: 1279-1289.
Liu et al., "Kinetics study of the 5 V spine! cathode LiMn15Ni0504 before and after surface modifications", J. Electrochem. Soc. (2009) 156(11): A833-A838.
Lu et al., "Probing the origin of enhanced stability of "AlPO4" nanoparticle coated LiCoO2 during cycling to high voltages: Combined XRD and XPS studies", Chem. Mater. (2009) 21: 4408-4424.
Moulder et al., "Handbook of X-ray Photoelectron Spectroscopy: A reference book of standard spectra for identification and interpretation of XPS data", Perkin-Elmer Corp. (1992) Eden Prairie, Minn. (261 pages).
Myung et al., "Role of alumina coating on Li—Ni—Co—Mn—O particles as positive electrode material for lithium-ion batteries", Chem. Mater. (2005) 17: 3695-3704.
Ohta et al., "Enhancement of the high-rate capability of solid-state lithium batteries by nanoscale interfacial modification", Adv. Mater. (2006) 18: 2226-2229.
Reimers et al., "Electrochemical and in situ x-ray diffraction studies of lithium intercalation in LixCo02", J. Electrochem. Soc. (1992) 139(8): 2091-2097.
Seki et al., "Fabrication of high-voltage, high-capacity all-solid-state lithium polymer secondary batteries by application of the polymer electrolyte/inorganic electrolyte composite concept", Chem. Mater. (2005) 17: 2041-2045.
Sun et al., "Surface structural change of ZnO-coated LiNi05Mn1 504 spine! as 5 V cathode materials at elevated temperatures", Electrochim. Acta (2003) 48(5): 503-506.
Thackeray et al., "Lithium insertion into manganese spinels", Mater. Res.; Bull. (1983) 18(4): 461-472.
Torres et al., "Low-temperature oxidation of nitrided iron surfaces", J. Phys. Chem. (2003) 107: 5558-5567.
Trenczek-Zajac et al., "Structural and electrical properties of magnetron sputtered Ti(ON) thin films: The case of TiN doped in situ with oxygen", J. Power Sources (2009) 194: 93-103.
Veith et al., "Nanoparticles of gold on y-Al2O3 produced by dc magnetron sputtering", J Catal (2005) 231: 151-158.
Walz et al., "Elevated temperature cycling stability and electrochemical; impedance of LiMn2O4 cathodes with nanoporous ZrO2 and TiO2 coatings", J; Power Sources (2010) 195(15): 4943-4951.
Wang et al., "Structural and electrochemical characterizations of surface- ; modified LiCoO2 cathode materials for Li-ion batteries", Solid State Ionics; (2002) 148(3) 335-342.
Yu et al., "A stable thin-film lithium electrolyte: Lithium phosphorus oxynitride",; J. Electrochem. Soc. (1997) 144(2): 524-532.

* cited by examiner

LIPON COATINGS FOR HIGH VOLTAGE AND HIGH TEMPERATURE LI-ION BATTERY CATHODES

CROSS REFERENCE TO RELATED APPLICATIONS

This Application is a divisional application of U.S. application Ser. No. 13/651,043 filed on Oct. 12, 2012, entitled "LIPON COATINGS FOR HIGH VOLTAGE AND HIGH TEMPERATURE Li-ION BATTERY CATHODES", the entirety of which is incorporated herein by reference.

STATEMENT REGARDING FEDERALLY SPONSORED RESEARCH

This invention was made with government support under contract No. DE-AC05-00OR22725 awarded by the U.S. Department of Energy. The government has certain rights in this invention.

FIELD OF THE INVENTION

This invention relates generally to lithium batteries, and more particularly to protective coatings for cathode materials.

BACKGROUND OF THE INVENTION

Improved energy density for rechargeable Li-ion batteries requires use of high-capacity and high-voltage cathode materials, but charging to voltages approaching 4.5-5V invariably causes rapid loss of capacity with cycling. This degradation is attributed to several mechanisms, including oxygen loss, transition metal dissolution, lattice or particle instability, or reactions with the electrolyte or impurities. One promising solution is to coat the cathode particle surface with a protective material, such as a metal oxide. At this time, it remains unclear why such metal oxide coatings improve the high-voltage cycling behavior and whether film uniformity is critical.

Generally coatings for cathode materials are stable compounds that do not contain lithium, such as $AlPO_4$, $ZrO_2$, $Al_2O_3$, $ZnO$, and $Bi_2O_3$. Coatings are typically applied to cathode powders by solution or sot gel coating. These materials then need to be heat treated at elevated temperature to decompose the precursor and form the oxide coating. The amount and morphology of the coating is not well characterized. In some cases the coating is clearly not uniform. In many cases, the coating adds substantially to the mass.

SUMMARY OF THE INVENTION

A lithium ion battery includes an anode and a cathode. The cathode comprises a lithium, manganese, nickel, and oxygen containing compound. A liquid electrolyte layer exits between the anode and the cathode to facilitate ion-transport. A protective layer is deposited between the cathode and the electrolyte. The protective layer comprises lithium phosphorus oxynitride.

The electrolyte can be free of lithium phosphorus oxynitride. The cathode can comprise $Li[Ni_xMn_{2-x}]O_4$, where x is 0.5±0.1.

The cathode can also comprise a lithium, manganese, oxygen, nickel and cobalt containing compound. The lithium, manganese, oxygen, nickel and cobalt containing compound can comprise $Li_{1+w}[Mn_xNi_yCo_z]O_2$, where $w+x+y+z=1$. Alternatively, the cathode composition can also be described in terms of layered-layered composite formula given by the general formula $xLi_2MnO_3 \cdot (1-x)LiMO_2$, where M=Mn, Co, Ni and x can range from 0.2-0.7. The lithium, manganese, oxygen, nickel and cobalt containing compound cathode compound can comprise $Li_{1.2}Mn_{0.525}Ni_{0.175}Co_{0.1}O_2$. The cathode can also comprise a solid solution of $Li_{1+x}Mn_{2-y}O_4$, where x and y are independently 0 to 0.2, and $Li_{1+w}[Mn_xNi_yCo_z]O_2$, where $w+x+y+z=1$.

The lithium phosphorus oxynitride protective layer can be from 0.5 nm to 1 μm thick.

The lithium phosphorus oxynitride protective layer can be vapor deposited on the lithium, manganese, nickel, and oxygen containing compound. The lithium, manganese, nickel, and oxygen containing compound can be provided as particles, and the protective layer can be vapor deposited on the exterior surface and surface accessible pores of the particles. The particles can have a diameter of between 10 nm and 50 μm, or between 100 nm and 15 μm.

The lithium, manganese, nickel, and oxygen containing compound can further comprise at least one dopant which enhances electronic transport in the protective layer. The dopant can be at least one selected from the group consisting of transition metal elements, such as Ti, Fe, Ni, V, Cr, Cu, and Co. The dopant can be provided at a concentration of between 1% to 100% of the P mole content, or in another aspect from 25%-50% of the P content by moles.

A method of making a cathode for a lithium ion battery can include the step of providing a cathode material comprising a lithium, manganese, nickel and oxygen containing compound. A lithium phosphate target is also provided. The lithium phosphate is sputtered in a nitrogen plasma to coat the lithium, manganese, nickel and oxygen containing compound with at least a 0.5 nm coating of lithium phosphorus oxynitride.

The sputtering step can be RF magnetron sputtering. The cathode material can be provided as particles. The method can further comprise the step of agitating, stirring, vibrating, or flowing the particles during the sputtering step.

The method can further comprise the step of applying a lithium salt electrolyte layer in operable contact with the cathode. The electrolyte layer can be free of lithium phosphorus oxynitride. The method can further comprise the step of applying an anode layer in operable contact with the electrolyte layer.

A lithium ion battery includes an anode, a cathode, and an electrolyte disposed between the anode and the cathode. A protective layer is disposed between the cathode and the electrolyte. The protective layer comprises lithium phosphorus oxynitride and at least one electronic transport enhancing dopant. The dopant can be at least one selected from the group consisting of Ti, Fe, Ni, V, Cr, Cu, and Co. The dopant can be provided at a concentration of from 1% to 100% of the P mole content, and in another embodiment can be provided at a concentration of from 25% to 50% of the P content by moles. The cathode can comprise a lithium, manganese, nickel and oxygen containing compound.

A method of operating a battery includes the steps of providing a lithium ion battery comprising an anode, a cathode, and an electrolyte layer between the anode and the cathode. The cathode comprises a lithium, manganese, nickel, and oxygen containing compound. The electrolyte can be free of lithium phosphorus oxynitride. A protective layer is sandwiched or deposited between the cathode layer and the electrolyte. The protective layer comprises lithium phosphorus oxynitride. The method further includes the step of operating the battery at elevated operating conditions comprising at least one selected from the group consisting of a temperature of at least 50° C. and a voltage of at least 4.5 V. The battery can be operated at a temperature of between 50° C. and 80° C. The battery can be operated at a voltage of between 4.5 V and 5.4 V.

A method of operating a battery includes the steps of providing a lithium ion battery comprising an anode, a cathode, and an electrolyte disposed between the anode and the cathode. The electrolyte can be free of lithium phosphorus oxynitride. A protective layer is deposited between the cathode layer and the electrolyte. The protective layer comprises lithium phosphorus oxynitride and at least one electronic transport enhancing dopant. The method further includes the step of operating the battery at elevated operating conditions comprising at least one selected from the group consisting of a temperature of at least 50° C. and a voltage of at least 4.5 V. The battery can be operated at a temperature of between 50° C. and 80° C. The battery can be operated at a voltage of between 4.5 V and 5.4 V. The dopant can be at least one selected from the group consisting of Ti, Fe, Ni, V, Cr, Cu, and Co. The dopant can be provided at a concentration of from 1% to 100% of the P mole content, and in another embodiment can be provided at a concentration of from 25% to 50% of the P content by moles. The cathode can comprise a lithium, manganese, nickel and oxygen containing compound.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1:
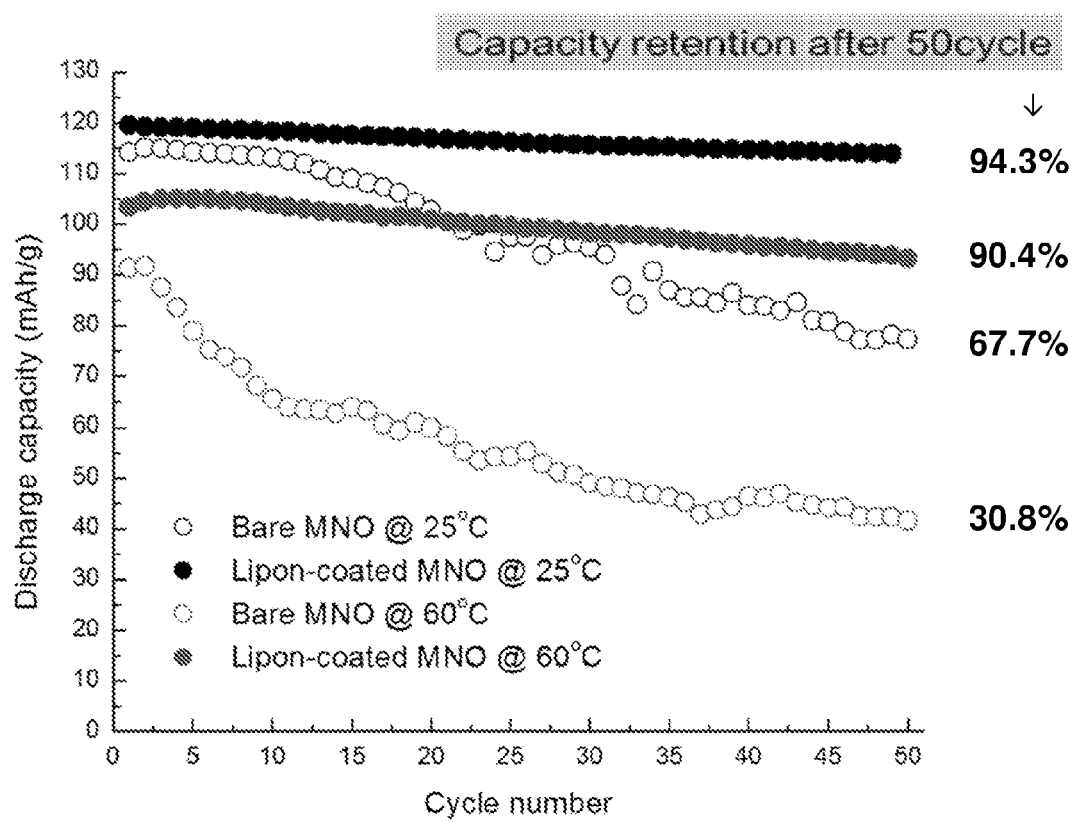
FIG. 1 is a plot of discharge capacity (mAh/g) with cycle number.

A lithium ion battery includes an anode and a cathode. The cathode comprises a lithium, manganese, nickel, and oxygen (LMNO) containing compound. An electrolyte is disposed between the anode and the cathode. A protective layer is disposed between the cathode and the electrolyte. The protective layer comprises lithium phosphorus oxynitride (Lipon). Lipon is an amorphous coating, free of grain boundaries. This material contains lithium, conducts lithium ions, and does not consume lithium as the battery is cycled.

A thin Lipon coating applied to a Li-ion battery cathode acts to stabilize the interface when cycled in a battery with a liquid organic liquid electrolyte, thus providing for an enhanced cycle life with less capacity fade. This is particularly important for cathodes cycled to higher voltage and higher temperatures. Dissolution and degradation processes are accelerated at higher temperatures and higher voltages. The Lipon may also slow the gradual increase in the internal resistance of the cell which gradually limits the power performance of the battery.

There is a large improvement for Lipon on LMNO cathodes such as Li(Ni$_{0.5}$Mn$_{1.5}$)O$_4$ cathodes cycled to high voltage at high temperature. The LiMn$_{1.5}$Ni$_{0.5}$O$_4$ (MNO) spine) cathode has a high voltage plateau ~4.7V, comprises non-toxic elements, and utilizes Mn which is much less expensive than Co in LiCoO$_2$.

The electrolyte can be free of lithium phosphorus oxynitride. The cathode can comprise Li[Ni$_x$Mn$_{2-x}$]O$_4$, where x is 0.5±0.1. The cathode compound can comprise LiMn$_{1.5}$Ni$_{0.5}$O$_4$. The cathode compound can xLi$_2$MnO$_3$.(1-x) LiMO$_2$, where M=Mn, Co, Ni and x can range from 0.2-0.7.

The cathode can comprise a lithium, manganese, oxygen, nickel and cobalt containing compound (NMC and sometimes MNC). The lithium, manganese, oxygen, nickel and cobalt containing compound can comprise Li$_{1+w}$[Mn$_x$Ni$_y$Co$_z$]O$_2$, where w+x+y+z=1. The lithium, manganese, oxygen, nickel and cobalt containing compound cathode compound can comprise Li$_{1.2}$Mn$_{0.525}$Ni$_{0.175}$Co$_{0.1}$O$_2$. This cathode is more generally known as a solid solution of Li[Li$_{1/3}$Mn$_{2/3}$]O$_2$+Li[Mn$_{0.3}$Ni$_{0.45}$Co$_{0.25}$]O$_2$. The cathode can comprise a solid solution of Li$_{1+x}$Mn$_{2-y}$O$_4$, where x and y are independently 0 to 0.2, and Li$_{1+w}$[Mn$_x$Ni$_y$Co$_z$]O$_2$, where w+x+y+z=1.

The lithium phosphorus oxynitride protective layer can be from 0.5 nm to 1 pm thick. At the low end, this represents a small additional mass to battery, <0.5%. The lithium phosphorus oxynitride protective layer can be from 0.5 nm to 10 nm thick.

The lithium phosphorus oxynitride protective layer can be vapor deposited on the lithium, manganese, nickel, and oxygen containing compound. The lithium, manganese, nickel, and oxygen containing compound can be provided as particles, and the protective layer can be vapor deposited on the exterior surface and surface accessible pores of the particles. The particles can have a diameter of between 100 nm and 15 μm, or between 10 nm and 50 μm.

Lipon coatings do not need to coat the full surface area of the cathode powders to be effective. Some cathode powders are quite porous and have a high surface area. It is unlikely that Lipon coats all of the surface area. The morphology of the coating is continuous with uniform thickness. The coating is conformal if the cathode surface is smooth and fully accessible to the vapor source.

Fabrication of the Cathode

A method of making a cathode for a lithium ion battery can include the step of providing a cathode material comprising a lithium, manganese, nickel and oxygen containing compound. A lithium phosphate target is also provided. The lithium phosphate is sputtered in a nitrogen plasma to coat the lithium, manganese, nickel and oxygen containing compound with at least a 1 nm coating of lithium phosphorus oxynitride.

The sputtering step can be RF magnetron sputtering. The cathode material can be provided as particles. The method can further comprise the step of agitating or flowing the particles during the sputtering step. The advantages of RF-magnetron sputtering include the absence of a need for drying, the application of smooth ~1 nm coatings are possible, no heat treatment is necessary, and it is a clean material process compared to solution-based approaches. There is also less material wasting compared to solution-based coating techniques. However, other application methods are possible and are within the scope of the invention.

Lipon is deposited by RF magnetron sputtering in a $N_2$ plasma at ambient temperature. This is a one step process. Lipon is deposited onto free flowing cathode powders, with sufficient stirring or tumbling of the powders during deposition for a uniform coating. In this case, the powder is then mixed with a binder and conductive additives to make a slurry, cast onto a metal foil current collector, dried, and finally pressed or calendared to make a typical battery electrode. Alternatively, Lipon can be deposited onto a prefabricated coating of the cathode material, which includes the cathode particles plus a binder plus other additives coated onto a metal foil current collector.

Assembly of the Li Battery

Any suitable electrolyte can be used. Suitable electrolytes include salts of lithium, including $LiPF_6$, $LiClO_4$, lithium bis(trifluoromethanesulfonyl)imide (LiTFSI), lithium bis(oxatlato)borate (LiBOB), dissolved in pure or mixtures of organic solvents, including linear and cyclic carbonates such a propylene carbonate, dimethyl carbonate, and others. A possible electrolyte is $LiPF_6$ dissolved in a mixture of organic carbonates including ethylene carbonate, dimethyl carbonate, ethyl methyl carbonate, or others. Other electrolytes might include alternative dissolved Li salts and solvents.

The method can further comprise the step of applying a lithium salt electrolyte layer in operable contact with the cathode. The electrolyte layer can be free of lithium phosphorus oxynitride. The method can further comprise the step of applying an anode layer in operable contact with the electrolyte layer in the case of solid state thin film batteries, or providing an anode that is wetted by a liquid electrolyte. Suitable anode materials include, but are not limited to, lithium metal, graphitic carbon, silicon, tin, as well as oxides and oxynitrides of these and other metals.

A method of operating a battery, includes the steps of providing a lithium ion battery comprising an anode, a cathode, and an electrolyte layer between the anode and the cathode. The cathode comprises a lithium, manganese, nickel, and oxygen containing compound. The electrolyte is free of lithium phosphorus oxynitride. A protective layer is disposed between the cathode layer and the electrolyte. The protective layer comprises lithium phosphorus oxynitride. The method further includes the step of operating the battery at elevated operating conditions comprising at least one selected from the group consisting of a temperature of at least 50° C. and a voltage of at least 4.5 V. The battery can be operated at a temperature of between 50° C. and 80° C. The battery can be operated at a voltage of between 4.5 V and 5.4 V.

The Lipon protective layer can further comprise at least one dopant which enhances electronic transport in the protective layer. The dopant can be at least one selected from the group consisting of transition metal elements, such as Ti, Fe, Ni, V, Cr, Cu, and Co. The dopant can be provided at a concentration of between 1% to 50% of the P mole content.

Lipon films doped with Ti and Fe are effective coatings. With Ti or Fe or another transition metal doping the thickness of the Lipon film can be increased. This is because the dopant increases the electronic conductivity so that contact can be established between the particles and current collector for a thick coating.

A lithium ion battery includes an anode, a cathode, and an electrolyte disposed between the anode and the cathode. A protective layer is disposed between the cathode and the electrolyte. The protective layer comprises lithium phosphorus oxynitride which in one embodiment can be essentially pure, and in another embodiment can comprise at least one electronic transport enhancing dopant. The dopant can be at least one selected from the group consisting of Ti, Fe, Ni, V, Cr, Cu, and Co. The dopant can be provided at a concentration of from 1% to 100% of the P mole content, and in another embodiment can be provided at a concentration of from 25% to 50% of the P mole content. The cathode can comprise a lithium, manganese, nickel and oxygen containing compound.

A method of operating a battery includes the steps of providing a lithium ion battery comprising an anode, a cathode, and an electrolyte disposed between the anode and the cathode. The electrolyte can be free of lithium phosphorus oxynitride. A protective layer is disposed between the cathode layer and the electrolyte. The protective layer comprises lithium phosphorus oxynitride and at least one electronic transport enhancing dopant. The method further includes the step of operating the battery at elevated operating conditions comprising at least one selected from the group consisting of a temperature of at least 50° C. and a voltage of at least 4.5 V. The battery can be operated at a temperature of between 50° C. and 80° C. The battery can be operated at a voltage of between 4.5 V and 5.4 V. The dopant can be at least one selected from the group consisting of Ti, Fe, Ni, V, Cr, Cu, and Co. The dopant can be provided at a concentration of from 1% to 100% of the P content, and in another embodiment can be provided at a concentration of from 25% to 50%. The cathode can comprise a lithium, manganese, nickel and oxygen containing compound.

Example

Metal Doping on Lithium Phosphorus Oxynitride (Lipon) Electrolytes.

RF-magnetron sputtering was used to apply a Lipon coating with a dopant to a cathode material. The target was 2 inch diameter $Li_3PO_4$ and the sputtering power was 80 W (110V). The sputtering distance was 5 cm. The dopant was added to the target by mixing in metal or oxide powder, adding metal foil pieces or strips to the top surface, or co-sputtering with a separate (second) target in addition to the $Li_3PO_4$ target. The sputtering time was 0.5, 2 and 6 hours. The cathode material was $LiMn_{1.5}Ni_{0.5}O_4$(MNO) (nGimat Co.) The BET surface area was ~8 m2/g, and the pore volume was ~0.05 cc/g.

Bond structures of metal-doped Lipon All metal-doped Lipon films had Lipon bond structures. N—O bond vibrations were observed in FTIR spectra. Based on XPS spectra, Fe (or Ti) may bond with oxygen. Coated and uncoated MNO particles had similar morphologies. Increasing the deposition time increased the amounts of phosphorus indicating thicker layers.

Cell Preparation

A CR2023 coin cell was prepared utilizing the resulting material Cathode:MNO:C:PVDF=80:10:10 wt % MNO/Celgard in 1.2 $LiPF_6$EC/EMC (1:1 v/v)/Li anode Cycling performance was similar at constant C-rate. The capacity retention @ 5 C was greater for Fe-Lipon-coated MNO than for other MNO samples. The cycling performance at 60° C. was better for coated MNO samples than for uncoated MNO sample. The capacity retention @ 5 C was better for Fe-Lipon-coated MNO than for Ti-Lipon-coated and Lipon-coated MNO, which were better than uncoated MNO.

FIG. 1 is a plot of discharge capacity (mAh/g) with cycle number. Lipon coatings improve capacity at room temperature and 60° C. Capacity retention is based on 1st discharge capacity. The Lipon-coated MNO at 25° C. had a capacity retention after 50 cycles of 94.3%.

Figure 2:
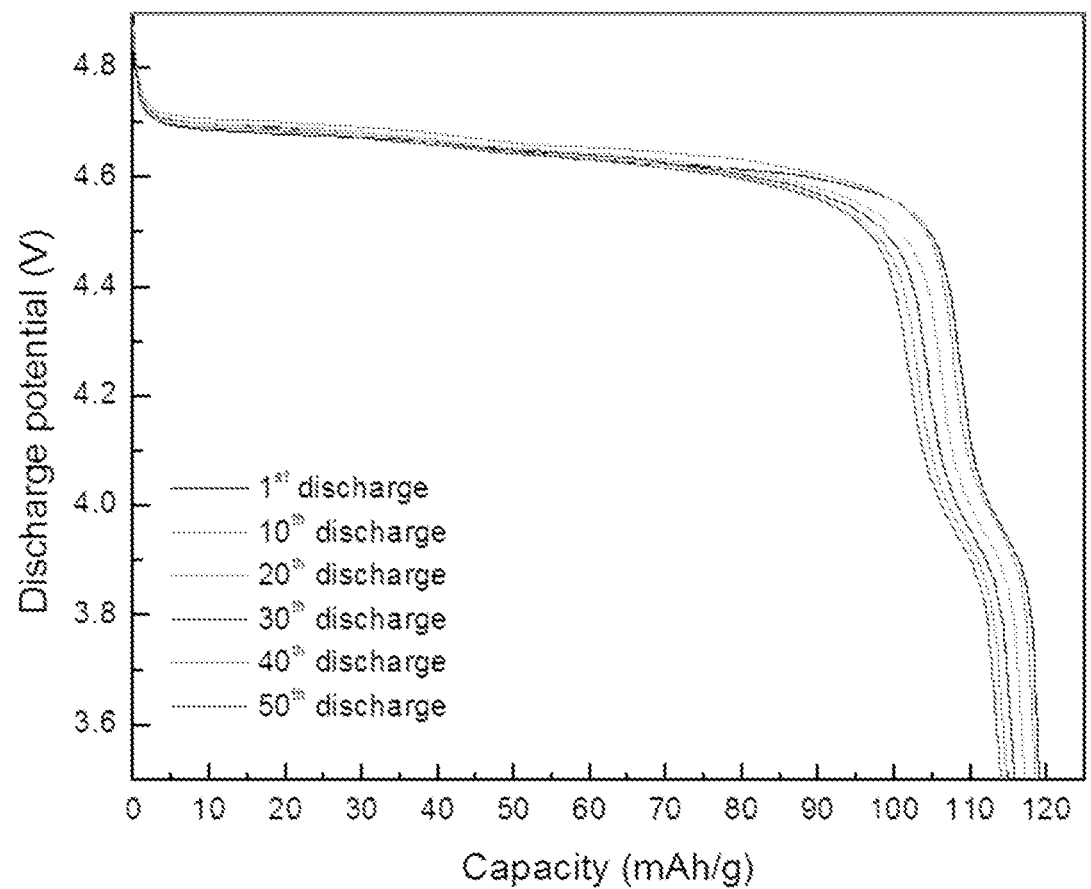
FIG. 2 is a plot of discharge potential (V) vs. capacity (mAh/g) for Lipon-coated MNO cycled at room temperature.
Figure 3:
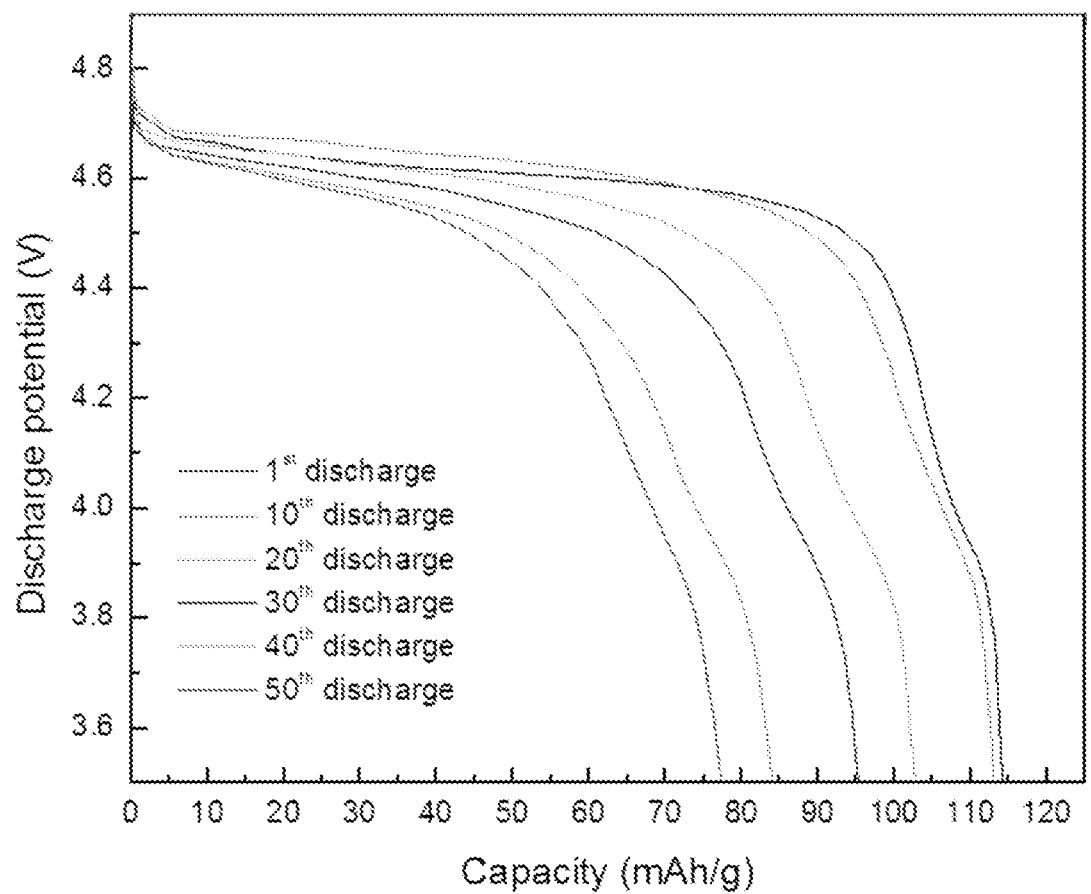
FIG. 3 is a plot of discharge potential (V) vs. capacity (mAh/g) for bare MNO cycled at room temperature.

FIG. 2 is a plot of discharge potential (V) vs. capacity (mAh/g) for Lipon-coated MNO. FIG. 3 is a plot of discharge potential (V) vs. capacity (mAh/g) for bare MNO. Both results are at room temperature.

Figure 4:
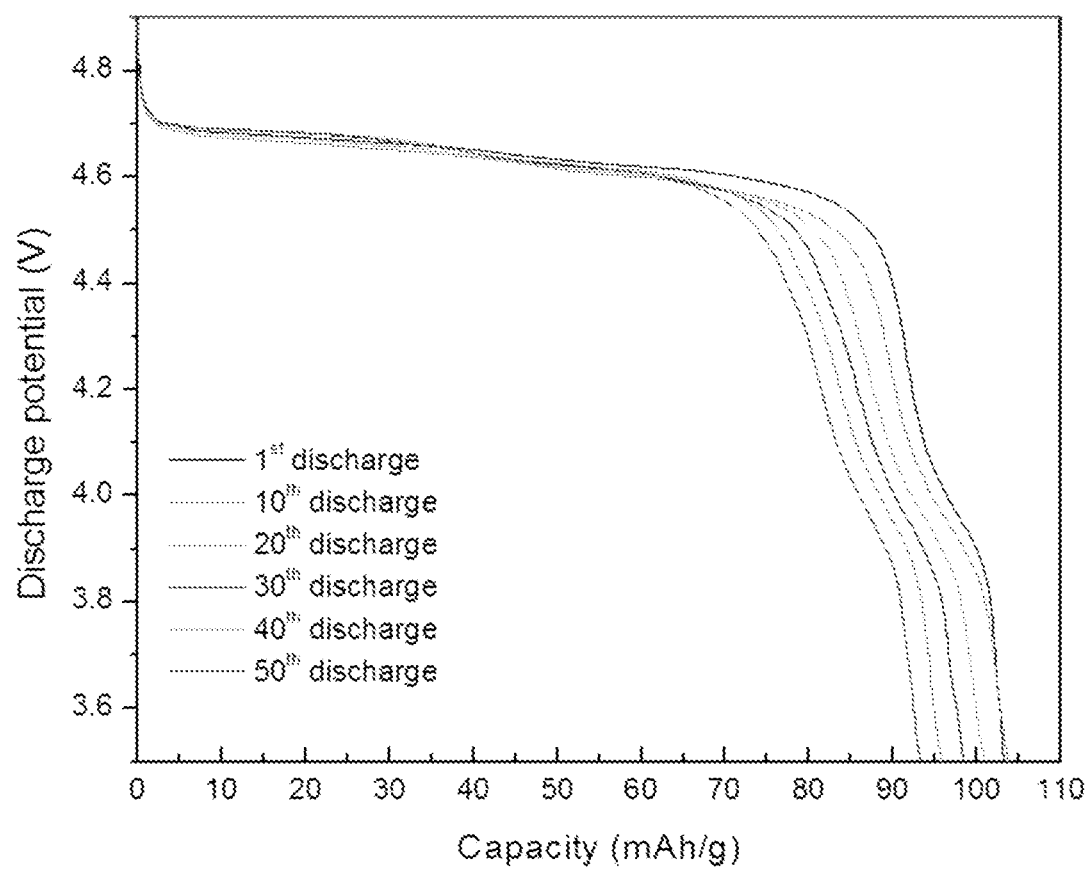
FIG. 4 is a plot of discharge potential (V) vs. capacity (mAh/g) for Lipon-coated MNO cycled at 60° C.
Figure 5:
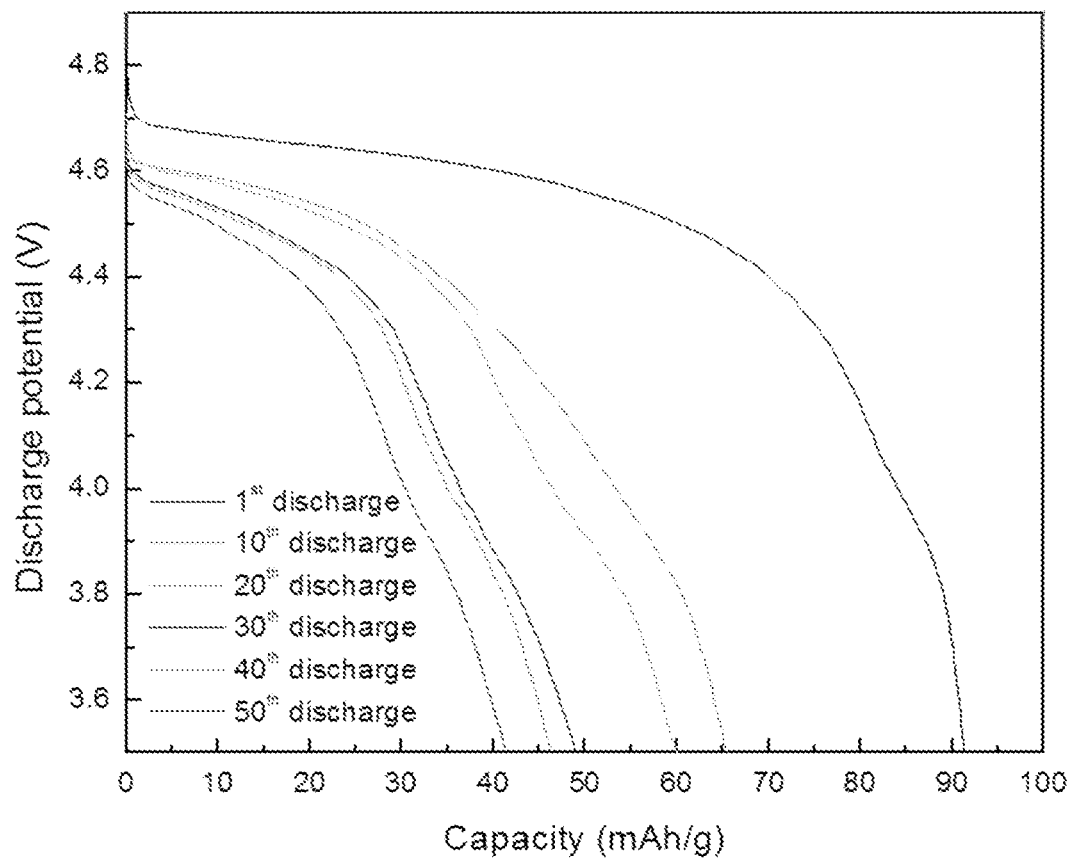
FIG. 5 is a plot of discharge potential (V) vs. capacity (mAh/g) for bare MNO cycled at 60° C.

FIG. 4 is a plot of discharge potential (V) vs. capacity (mAh/g) for Lipon-coated MNO cycled at 60° C. FIG. 5 is a plot of discharge potential (V) vs. capacity (mAh/g) for bare MNO cycled at 60° C.

Figure 6:
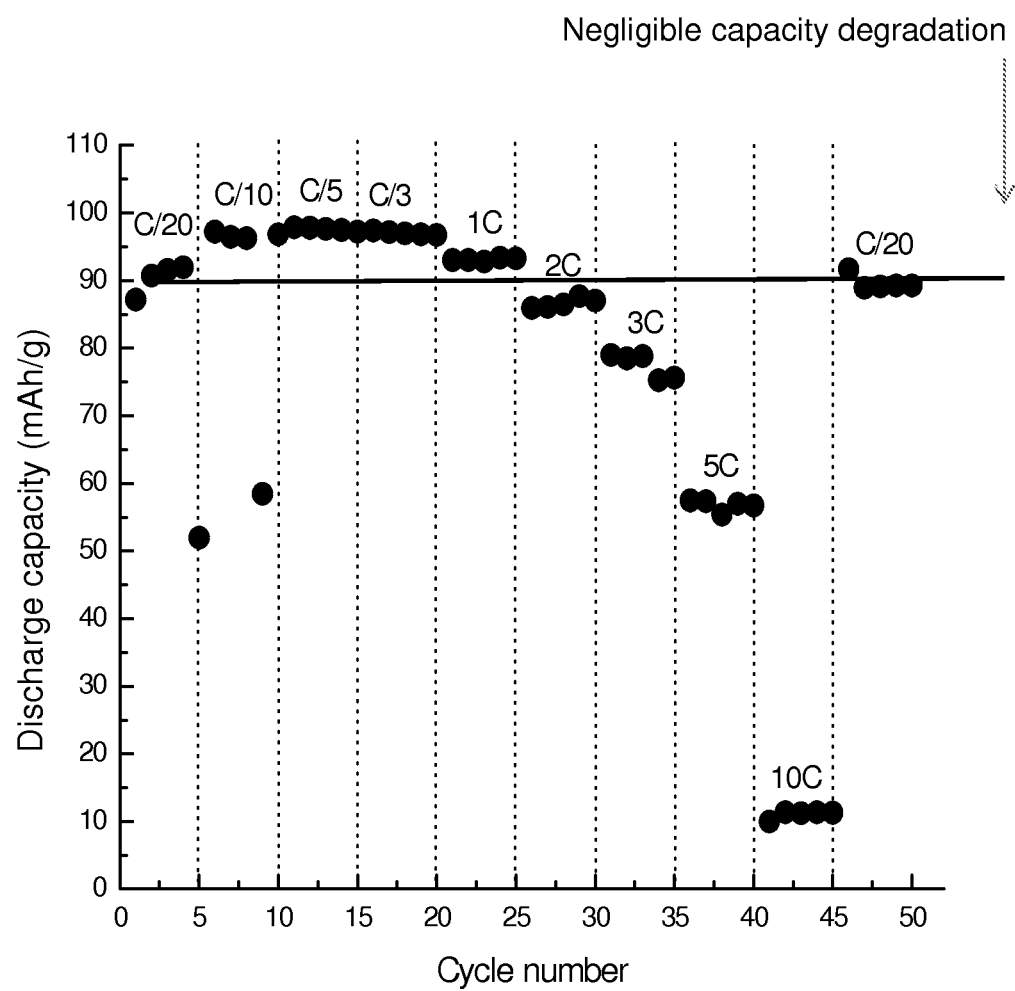
FIG. 6 is a plot of discharge capacity vs. cycle number at various C-rates, cycled at 25° C.

FIG. 6 is a plot of discharge capacity vs. cycle number at various C-rates, cycled at 25° C. There is negligible capacity reduction at increasing C-rates.

Figure 7:
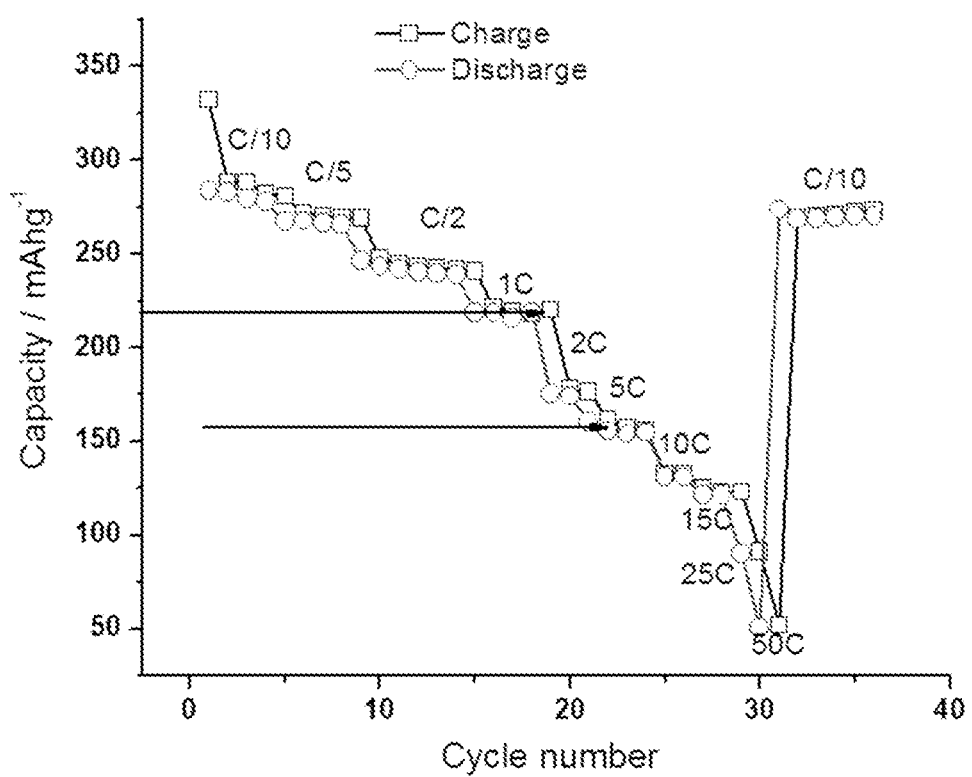
FIG. 7 is a plot of capacity (mAh/g) vs. cycle number for Lipon coated Li-rich MNC at differing C-rates.
Figure 8:
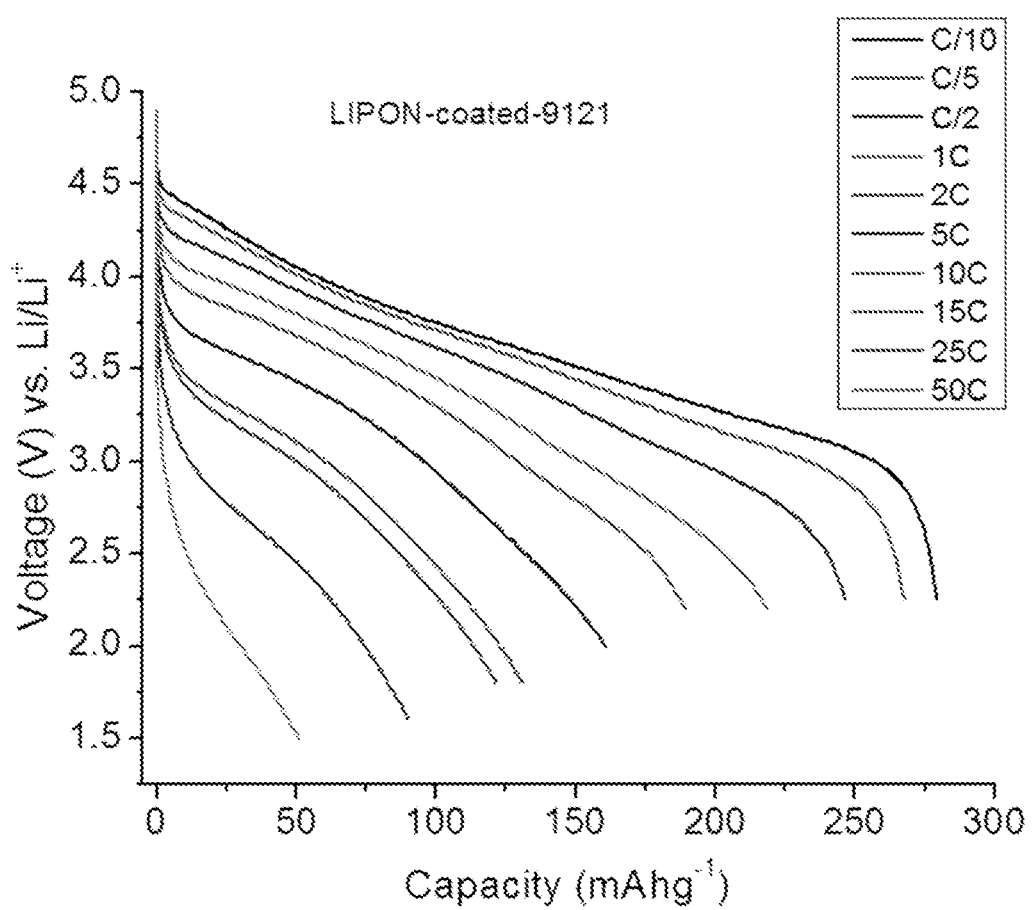
FIG. 8 is a plot of voltage (V) vs. Li/Li$^+$ vs. capacity (mAh/g) at different C-rates.

FIG. 7 is a plot of capacity/mAhg$^{-1}$ vs. cycle number for Lipon coated Li-rich MNC at differing C-rates. FIG. 8 is a plot of voltage (V) vs. Li/Li$^+$ vs capacity (mAhg$^{-1}$) at different C-rates. A 220 mAh/g at a rate of 1 C is achieved.

Figure 9:
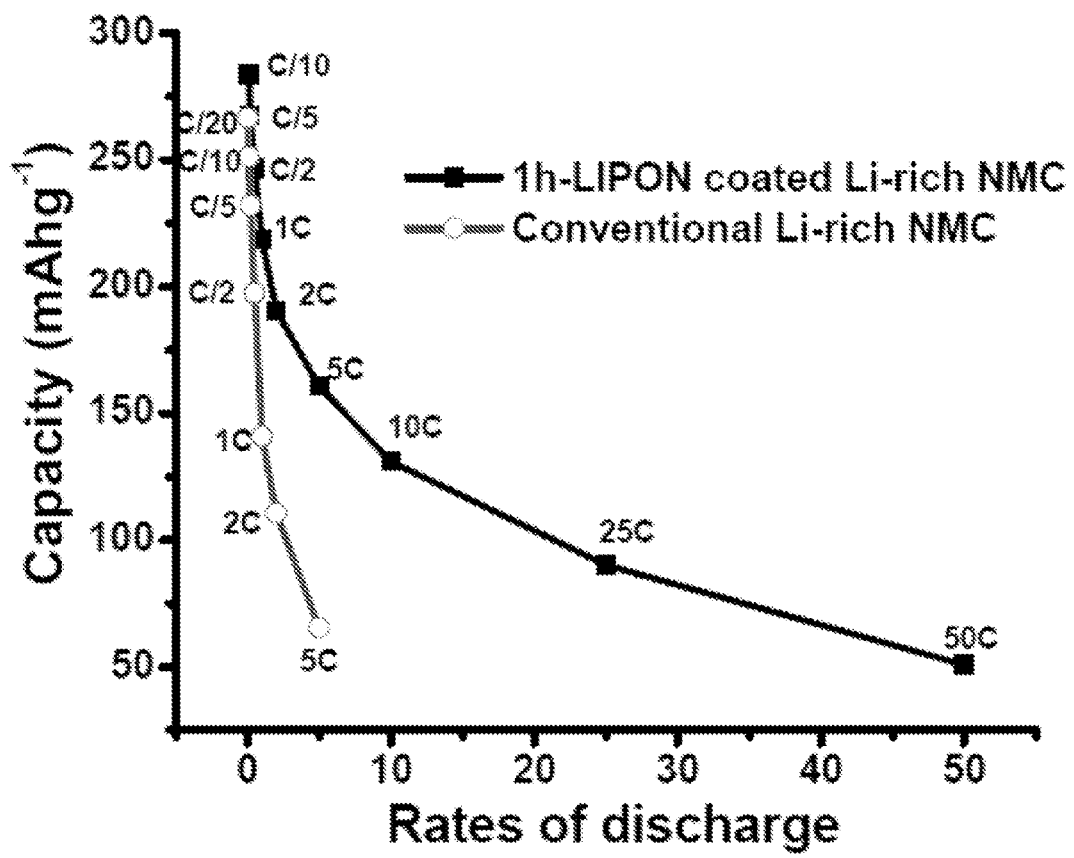
FIG. 9 is a plot of capacity (mAh/g) vs. rates of discharge for 1 h-Lipon coated Li-rich NMC and 3 h-Lipon coated Li-rich NMC.
Figure 10:
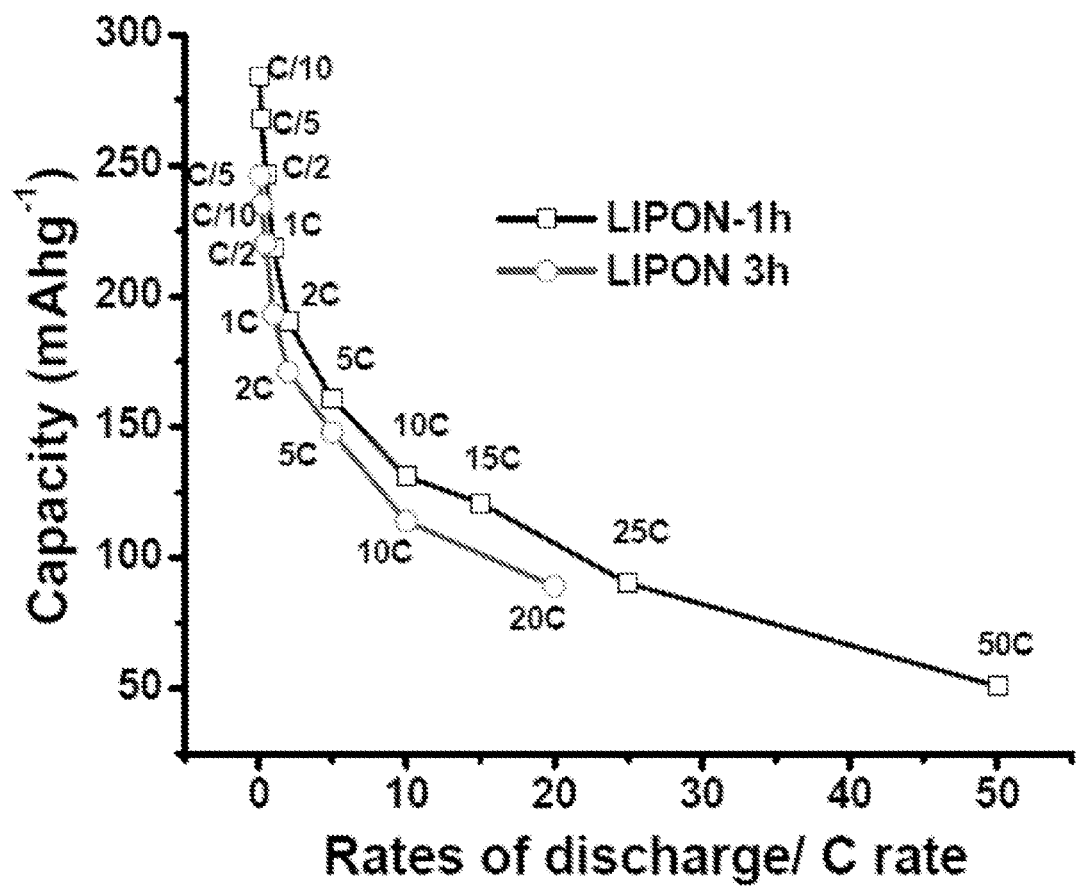
FIG. 10 is a plot of capacity (mAh/g) vs. rates of discharge/C rate for Lipon coated Li-rich NMC and convention

FIG. 9 is a comparison of discharge capacity datas of conventional and 1 h LIPON (3D) coated on Li-rich NMC composite electrodes at various rates in EC-DMC 1:2/$LiPF_6$ 1.2 M solutions (at 25° C.). FIG. 10 is a comparison of discharge capacity datas of 1 h and 3 h LIPON (3D) coated on Li-rich NMC composite electrodes at various rates in EC-DMC 1:2/$LiPF_6$ 1.2 M solutions (at 25° C.).

Figure 11:
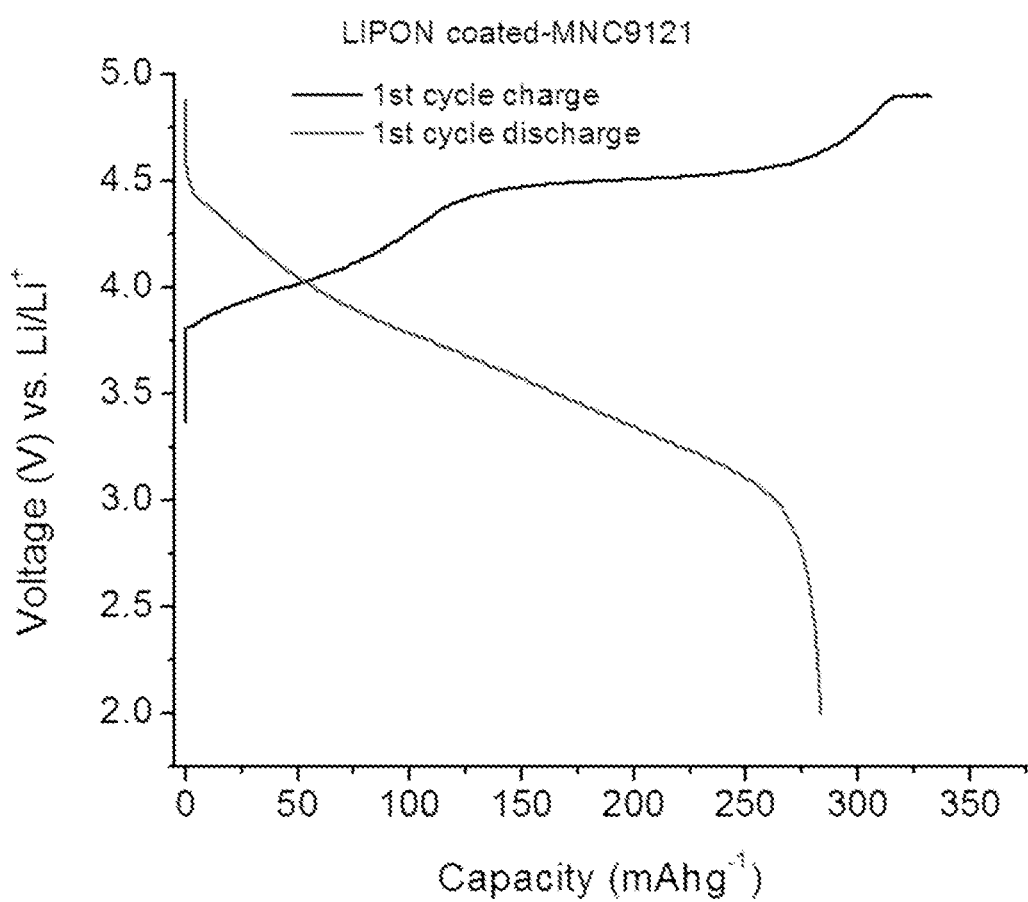
FIG. 11 is a plot of voltage (V) vs. Li/Li$^+$ vs capacity (mAh/g) for Lipon-coated NMC for a 1$^{st}$ cycle charge and a first cycle discharge.

FIG. 11 is a plot of voltage (V) vs. Li/Li$^+$ vs capacity (mAhg$^{-1}$) for Lipon-coated Li-rich MNC for a 1$^{st}$ cycle charge and a first cycle discharge.

Figure 12:
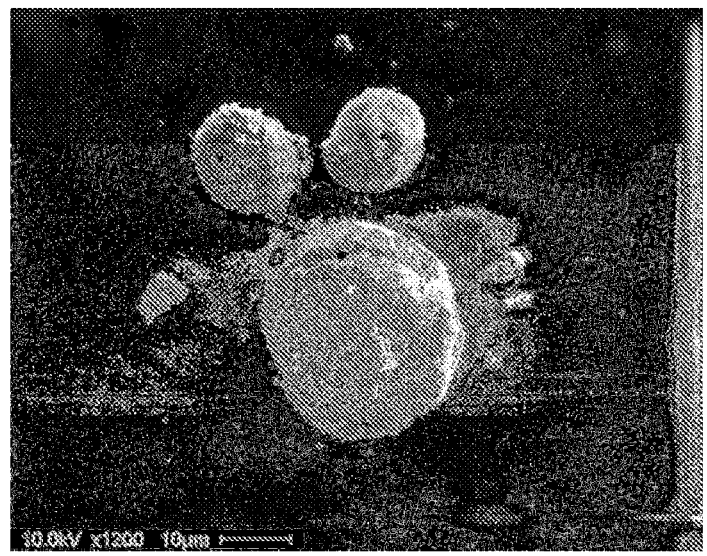
FIG. 12 is a scanning electron micrograph (SEM) of uncoated LiMn$_{1.5}$Ni$_{0.5}$O$_4$.
Figure 13:
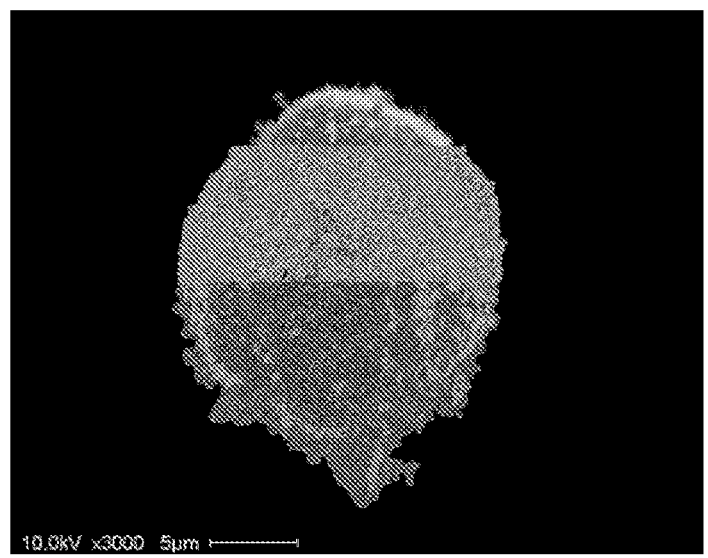
FIG. 13 is an SEM of Lipon-coated LiMn$_{1.5}$Ni$_{0.5}$O$_4$ after a 0.5 hr deposition.
Figure 14:
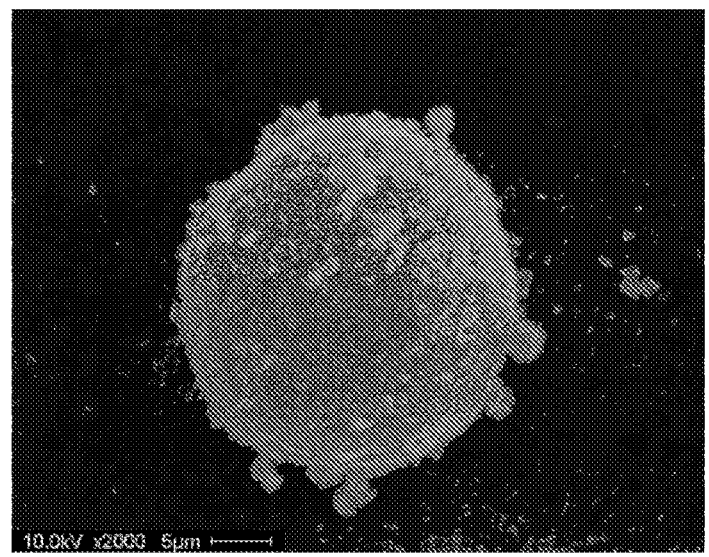
FIG. 14 is an SEM of Fe-Lipon-coated LiMn$_{1.5}$Ni$_{0.5}$O$_4$ after a 2 hr deposition.
Figure 15:
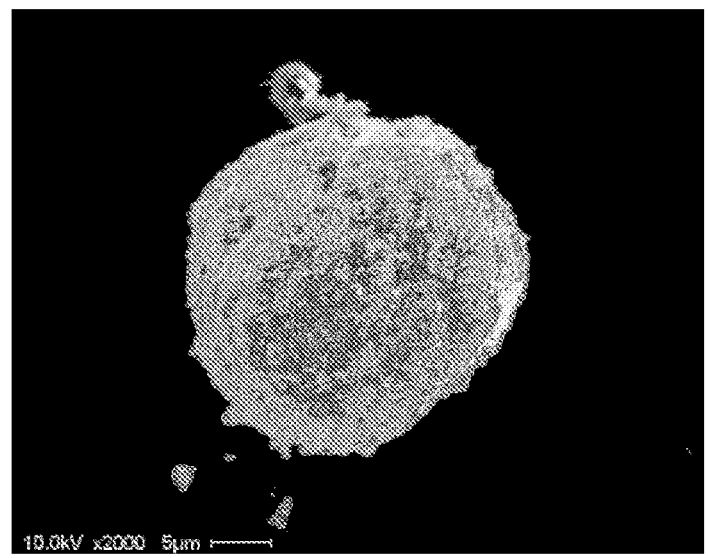
FIG. 15 is an SEM of Ti-Lipon-coated LiMn$_{1.5}$Ni$_{0.5}$O$_4$ after a 2 hr deposition.

FIG. 12 is an SEM of uncoated $LiMn_{1.5}Ni_{0.5}O_4$. FIG. 13 is an SEM of Lipon-coated $LiMn_{1.5}Ni_{0.5}O_4$ after a 0.5 hr deposition. FIG. 14 is an SEM of Fe-Lipon-coated $LiMn_{1.5}Ni_{0.5}O_4$ after a 2 hr deposition. FIG. 15 is an SEM of Ti-Lipon-coated $LiMn_{1.5}Ni_{0.5}O_4$ after a 2 hr deposition. There is no morphological difference between the MNO samples.

Figure 16:
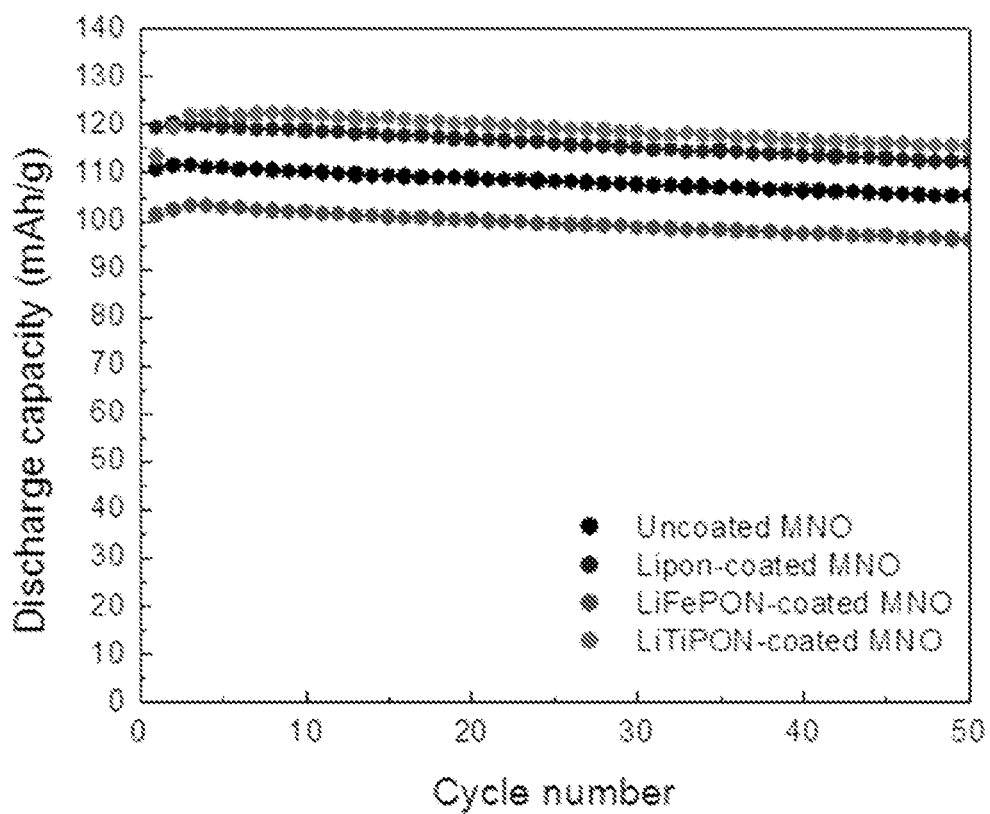
FIG. 16 is a plot of discharge capacity (mAh/g) vs. cycle number for uncoated MNO, Lipon-coated MNO, Fe-Lipon-coated MNO, and Ti-Lipon-coated MNO, cycled at room temperature.

FIG. 16 is a plot of discharge capacity (mAh/g) vs. cycle number for uncoated MNO, Lipon-coated MNO, Fe-Lipon-coated MNO, and Ti-Lipon-coated MNO, cycled at room temperature.

Figure 17:
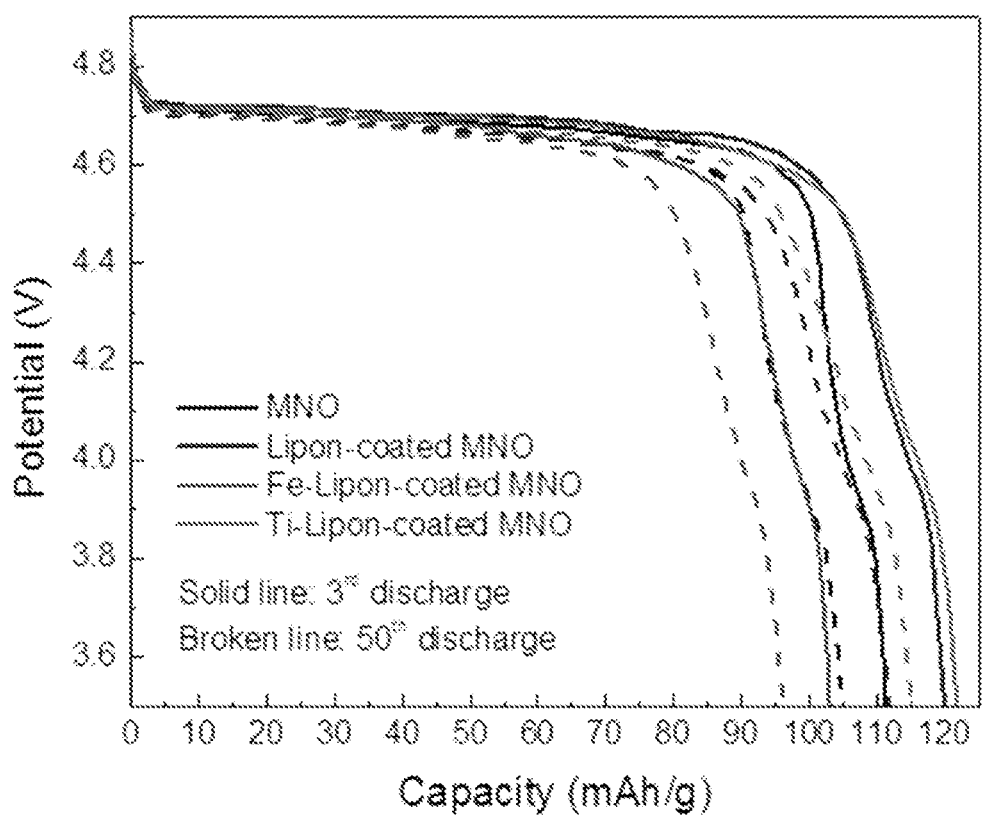
FIG. 17 is a plot of potential (V) vs. capacity (mAh/g) for uncoated MNO, Lipon-coated MNO, Fe-Lipon-coated MNO, and Ti-Lipon-coated MNO, cycled at room temperature.

FIG. 17 is a plot of potential (V) vs. capacity (mAh/g) for uncoated MNO, Lipon-coated MNO, Fe-Lipon-coated MNO, and Ti-Lipon-coated MNO, cycled at room temperature.

Figure 18:
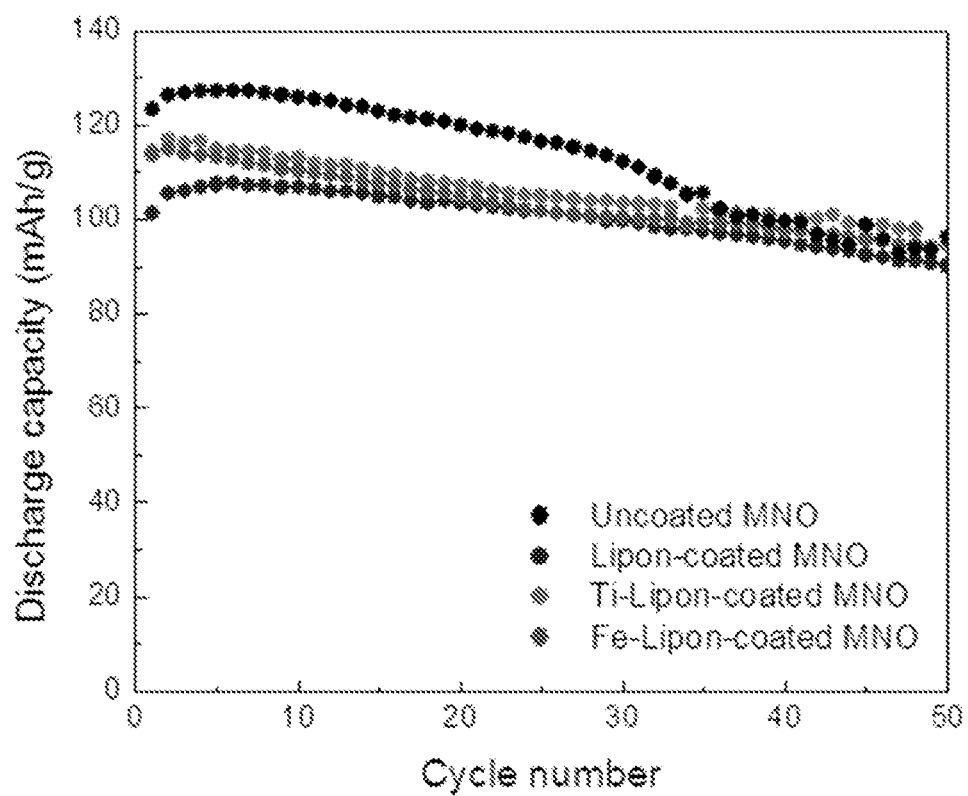
FIG. 18 is a plot of discharge capacity (mAh/g) vs. cycle number for uncoated MNO, Lipon-coated MNO, Fe-Lipon-coated MNO, and Ti-Lipon-coated MNO, cycled at 60° C.

FIG. 18 is a plot of discharge capacity (mAh/g) vs. cycle number for uncoated MNO, Lipon-coated MNO, Fe-Lipon-coated MNO, and Ti-Lipon-coated MNO, cycled at 60° C.

Figure 19:
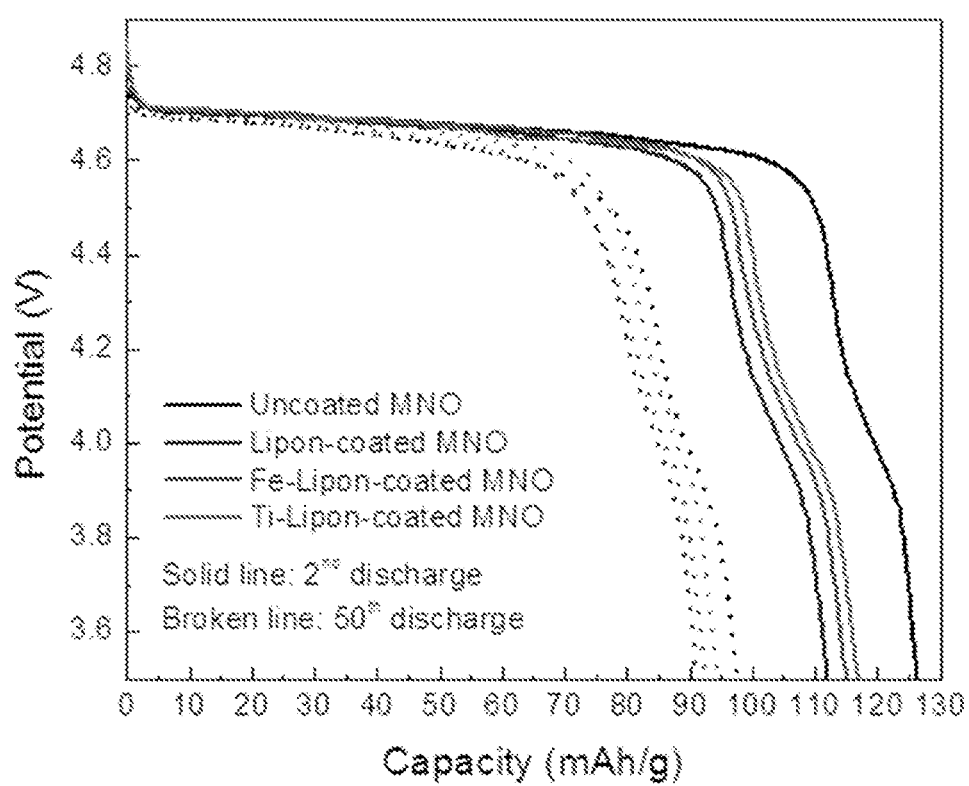
FIG. 19 is a plot of potential (V) vs. capacity (mAh/g) for uncoated MNO, Lipon-coated MNO, Fe-Lipon-coated MNO, and Ti-Lipon-coated MNO, cycled at 60° C.

FIG. 19 is a plot of potential (V) vs. capacity (mAh/g) for uncoated MNO, Lipon-coated MNO, Fe-Lipon-coated MNO, and Ti-Lipon-coated MNO, cycled at 60° C.

The foregoing description of the preferred embodiments of the invention has been presented for purposes of illustration. The invention is not limited to the embodiments disclosed. Modifications and variations to the disclosed embodiments are possible and within the scope of the invention.

We claim:

1. A method of operating a battery, comprising the steps of:
providing a lithium ion battery comprising an anode, a cathode, the cathode comprising a lithium, manganese, nickel, and oxygen containing compound, an electrolyte disposed between the anode and the cathode, the electrolyte being free of lithium phosphorus oxynitride; and a protective layer disposed between the cathode layer and the electrolyte, the protective layer comprising lithium phosphorus oxynitride;
wherein the protective layer is provided as a uniform coating from 0.5 to 10 nm on all sides of the particles prior to the electrode preparation, the coated particles being unannealed; and,
operating the battery at elevated operating conditions comprising at least one selected from the group consisting of a temperature of at least 50° C. and a voltage of at least 4.5 V, the battery having capacity retention at 60° C.

2. The method of claim 1, wherein the battery is operated at a temperature of between 50° C. and 80° C.

3. The method of claim 1, wherein the battery is operated at a voltage of between 4.5 V and 5.4 V.

4. A method of operating a battery, comprising the steps of:
providing a lithium ion battery comprising an anode, a cathode, and an electrolyte disposed between the anode and the cathode, the electrolyte being free of lithium phosphorus oxynitride; and a protective layer disposed between the cathode layer and the electrolyte, the protective layer comprising lithium phosphorus oxynitride and at least one electronic transport enhancing dopant;
wherein the protective layer is provided as a uniform coating from 0.5 to 10 nm on all sides of the of the particles prior to the electrode preparation, the coated particles being unannealed; and,
operating the battery at elevated operating conditions comprising at least one selected from the group consisting of a temperature of at least 50° C. and a voltage of at least 4.5 V, the battery having capacity retention at 60° C.

5. The method of claim 4, wherein the dopant is at least one selected from the group consisting of transition metal elements.

6. The method of claim 5, wherein the transition metal element is at least one selected from the group consisting of Ti, Fe, Ni, V, Cr, Cu, and Co.

7. The method of claim 4, wherein the battery is operated at a temperature of between 50° C. and 80° C.

8. The method of claim 4, wherein the battery is operated at a voltage of between 4.5 V and 5.4 V.

9. The method of claim 4, wherein the cathode comprises a lithium, manganese, nickel, and oxygen containing compound.

* * * * *